United States Patent [19]

Horvei

[11] Patent Number: 4,850,505
[45] Date of Patent: Jul. 25, 1989

[54] MECHANISM FOR LOCKING OF A COVER AGAINT A FLANGE

[75] Inventor: Knut Horvei, Sandnes, Norway

[73] Assignee: Den norske stats oljeselskap a.s, Norway

[21] Appl. No.: 163,760

[22] PCT Filed: Jul. 7, 1987

[86] PCT No.: PCT/N087/00053
§ 371 Date: Mar. 29, 1988
§ 102(e) Date: Mar. 29, 1988

[87] PCT Pub. No.: WO88/00309
PCT Pub. Date: Jan. 14, 1988

[30] Foreign Application Priority Data

Jul. 7, 1986 [NO] Norway ............................. 862,728

[51] Int. Cl.$^4$ .......................................... B65D 45/16
[52] U.S. Cl. ................................. 220/319; 220/324
[58] Field of Search ......................... 220/324, 319, 320

[56] References Cited

U.S. PATENT DOCUMENTS

| 1,841,882 | 1/1932 | DeFrancisci . |
| 1,871,834 | 8/1932 | Astrom . |
| 2,575,667 | 11/1951 | Krøyer . |
| 3,387,738 | 6/1968 | Kemp ............................. 220/324 X |
| 3,647,108 | 3/1972 | Kemp . |
| 3,991,902 | 11/1976 | Ford ................................... 220/324 |
| 4,166,549 | 9/1979 | Schultz et al. ...................... 220/319 |
| 4,190,074 | 2/1980 | Mailliet et al. . |

FOREIGN PATENT DOCUMENTS

| 0208412 | 1/1987 | European Pat. Off. . |
| 1245235 | 7/1967 | Fed. Rep. of Germany . |
| 1245235 | 7/1967 | Fed. Rep. of Germany . |
| 3119028 | 12/1982 | Fed. Rep. of Germany . |
| 3217819 | 11/1983 | Fed. Rep. of Germany . |
| 3429312 | 2/1986 | Fed. Rep. of Germany . |
| 1594134 | 7/1970 | France . |
| 156704 | 11/1987 | Norway . |
| 8702094 | 4/1987 | PCT Int'l Appl. . |
| 334073 | 7/1971 | Sweden . |

Primary Examiner—Donald F. Norton
Attorney, Agent, or Firm—Lucas & Just

[57] ABSTRACT

A device for clamping and locking of cover (6) against a flange (7) for subsea installations, particularly in connection with production of oil and/or gas, and particularly for clamping and locking of a valve housing cover (6) against a flange (7) on a valve housing (9) which is coupled into a subsea pipeline (1). Mainly U-formed locking segments (4) are designed with a certain clearance, preferably approx. 3 mm, so that the distance between the opposite facing, parallel contact and sealing surfaces of the locking segment (4) exceeds the total thickness of the cover (6) and flange (7). The internal pressure of the subsea installation (9) internal pressure is utilized to urge the cover (6) away from the flange (7) and against the adjacent contact and sealing surfaces of the locking segments (4), to that the locking segments thereby absorb the entire force from the internal pressure of the subsea installation, at the same time as the cover (6) thus is maintained in its position clamped against the flange (7) by means of the locking segments (4), as the cover (6) and flange (7) are designed with surfaces which are displaceable against each other and with a sealing device in between.

6 Claims, 6 Drawing Sheets

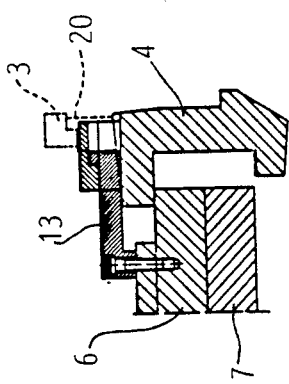
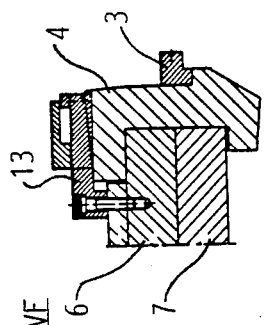
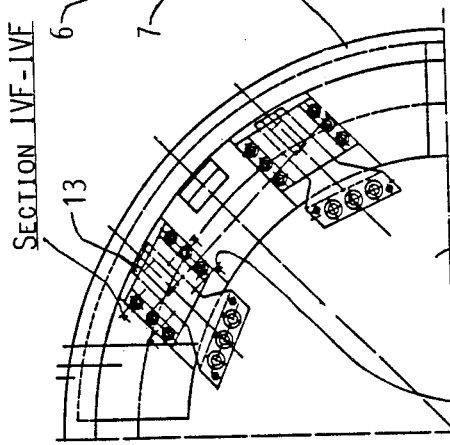
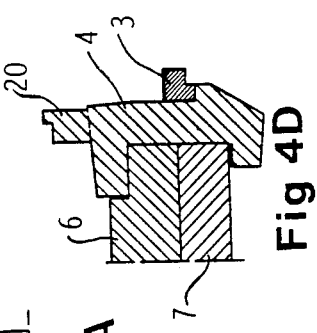

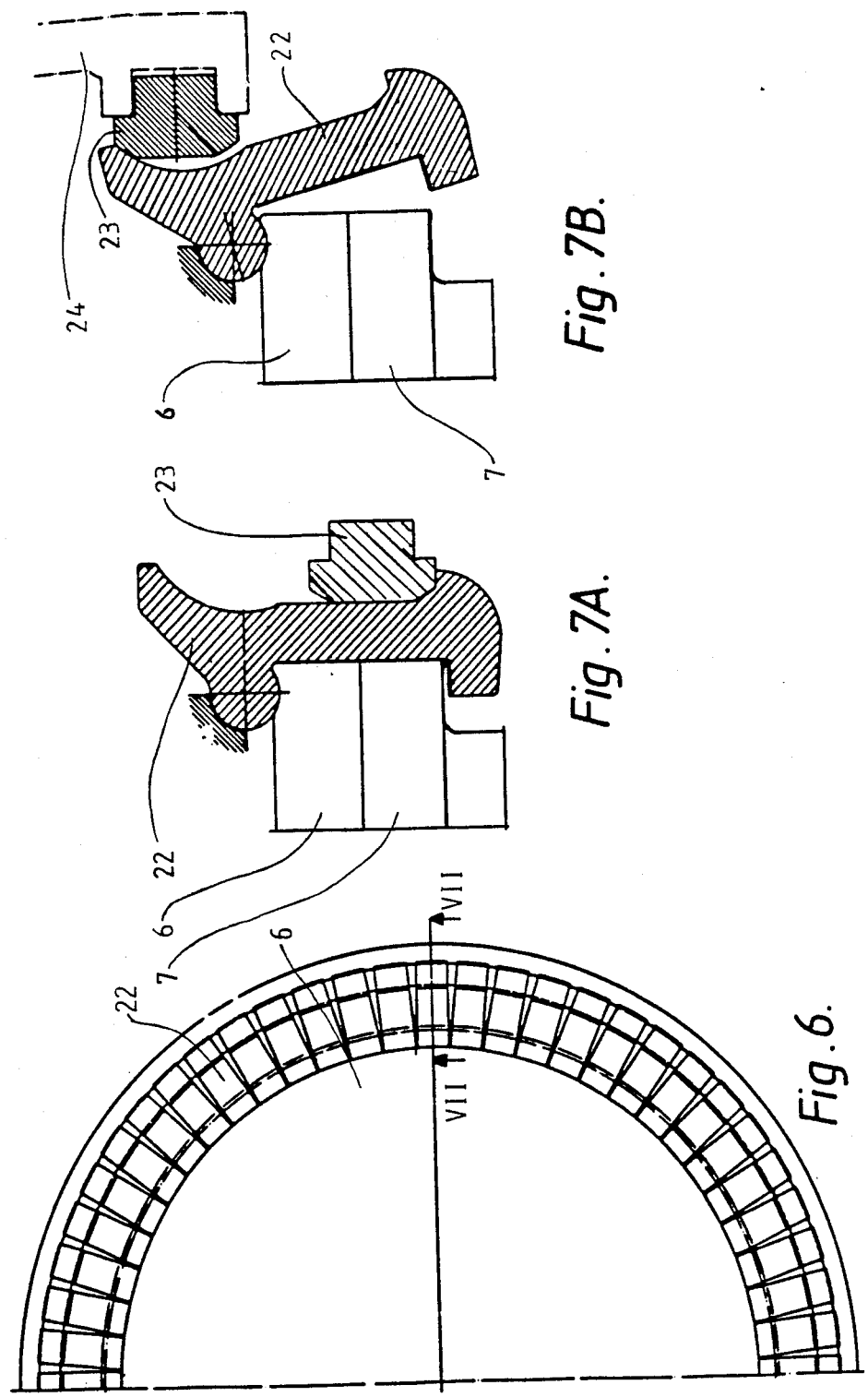

MECHANISM FOR LOCKING OF A COVER AGAINT A FLANGE

The present invention relates to a device for clamping and locking of a cover against a flange in connection with subsea installations, particularly in connection with the production of oil and/or gas, and more particularly for clamping and locking of a housing cover against a flange on a valve housing for subsea pipelines. The clamping and locking device has comprehensive flexible locking segments when in an operating position mainly have the shape of a lying U with the opening turned in toward the middle of the cover, and which feature opposite facing contact and sealing surfaces for engagement with cover and flange.

TECHNICAL FIELD

A transportation pipeline for oil and/or gas represents a considerable volume which is subjected to pressure, and a possible blow-out can therefore be of long duration unless it can be shut off. In the event of a rupture of the transportation pipeline near a platform or other offshore installation, escaping gas and/or oil can be ignited. The result can be disastrous for human life as well as field economy.

Emergency shut-down equipment in the form of appropriate valves is therefore of vital importance.

The laying of pipelines at great depths normally takes place by welding together pipe joints to a pipeline on an installation vessel, after which the pipeline is continuously laid out from the aft side of the installation vessel over a ramp. Simultaneously, the installation vessel is towed or pulled forwards by means of tub-boats or by means of an anchor/winch system.

BACKGROUND ART

So far, installation of valves in the pipeline simultaneously with the laying of the pipeline has been difficult. This is mainly due to the weight and rigidity of the valves. An actuator is often mounted on top of the valves, and the installation of the valves on the seabed must therefore be closely monitored. The actuator on the valve housing cover cannot deviate many degrees from straight upright position before the function becomes problematic. These difficulties have in many cases contributed to the installation of the valve on the pipeline after the latter is installed on the seabed. The installation of the valve can take place by cutting off a piece of the pipeline and welding the valve into the resulting space.

Another procedure for the laying of pipelines consists of the insertion of a blind tube where a valve is desired to be mounted. This blind tube acts as a temporary joint to the other parts of the pipeline and must be of the same length as the valve to be inserted.

A known emergency shut-down valve will for a 20" pipeline have a length of approx. 6 meters and a weight of approx. 50–80 tons. Inspection, control and maintenance of such a valve must take place at certain intervals, and the inspection etc. will be endeavored to be executed without interruption of the production. A known method for implementation of this is that an internally displaceable telescopic tube is mounted in the valve housing area and is moved to isolate the valve housing from the pipeline. Thus, the valve chamber with check valve is shut off from the production pipe. Thereafter, the housing cover with check valve and actuator can be dismantled for inspection. Such an operation requires that the housing cover can be relatively easily and quickly released from the valve housing flange.

Mounting and possible dismantling must be feasible at great depths. It is therefore important that this work can be implemented in an easy, simple and quick way with a minimum risk of damage.

The state of the prior art moreover comprises U.S. Pat. Nos. 1,841,882 issued Jan. 19, 1932; 2,575,667 issued Nov. 20, 1951; 3,647,108 issued Mar. 7, 1972; and German Patent No. 1,245,235 issued July 20, 1967.

U.S. Pat. No. 1,841,882 relates to a hydraulic motor where the motor cylinder has a head or cover screwed on, designed with four locking segments similarly spaced around the circumference. Each of these locking segments are U-shaped where the facing contact and sealing surfaces are not parallel, but form an acute angle with each other. The engagement between an outward facing flange on the motor cylinder and the lock segments is determined by the shape and takes place under prestressing of the locking segments. Such a locking device is therefore not very appropriate for clamping and locking of a cover to a valve housing on subsea pipelines at great depths, where simple installation is required without pressure or great pre-stressing forces.

U.S. Pat. No. 2,575,667 relates to a pressure-resistant heating vessel where the cover is clamped and locked to a flange on the container by means of a number of locking segments similarly spaced around the periphery with curved opposite facing sealing surfaces. Also here, the clamping/locking is determined by the shape and takes place under engagement between interacting parts and pre-stressing of the locking segments. This locking device, too, is inappropriate for the purpose concerned, where pre-stressing of the locking segments should be avoided to the greatest possible extent.

U.S. Pat. No. 3,647,108 relates to a closure for pressure vessels, including a resilient seal ring having an outer lip and an inward by turned flange angularly disposed to the outer lip, whereby pressure within the vessel is exerted through an opening in the seal ring to urge this into a position where it forms a sealing relation with the vessel around an opening in the vessel. The closure member contains a dent for accommodation of the sealing ring and a number of anchoring elements in the dent, where the anchoring elements have surfaces for engagement with slip-rings to press the slip-rings to engaging contact with a portion of the vessel. Moreover, it should be clear that such a locking device with resilient seal ring is entirely inadequate at great depths.

German Pat. No. 1,245,235 relates to a safety device for shutters or covers for pressure vessels, where locking is determined by the shape and takes place under engagement and pre-stressing of locking elements similarly spaced around the shutter/cover circumference. Also this well-known device suffers from the disadvantages and deficiencies emphasized in connection with the abovementioned locking devices.

DISCLOSURE OF INVENTION

As mentioned above, the present invention relates to a device for clamping and locking of a cover against a flange for subsea installations, particularly in connection with the production of oil and/or gas, and particularly the clamping and locking of a housing cover to a valve housing for subsea pipelines. The aim has been to provide a device which meets the requirements of safety and simple installation.

For this objective, the invention distinguishes itself by the features stated below.

The locking segments are mounted with pre-determined clearance, thus, the installation can be simple and without pressure or great pre-stressing forces. The locking segments are designed with opposite facing, parallel contact and sealing surfaces and can be advantageously locked into position by means of a simple encompassing ring.

According to the invention, the actual clamping and locking of housing cover of the valve housing takes place by utilization of internal pressure in the valve housing. This represents the basic idea behind the present invention.

For a 20" valve in a pipeline for oil and/or gas, the internal pressure will vary between 70 and 170 bar. This represents a compressive force against the housing cover of 1100 to approx. 2700 tonnes. The housing cover is thus lifted approx. 3 millimetres before the locking segments assume all of this force. This represents the normal situation for the valve, and in this position, the valve cover is clamped to the valve flange through the locking segments.

The preferred, non-restricted, embodiments of the invention are described below with reference to the drawings, where:

BRIEF DESCRIPTION OF DRAWINGS

FIGS. 4A through 4G illustrate a locking segment of the present invention where the locking segment is slidably mounted onto the housing cover;

FIGS. 6, 7A and 7B illustrate a locking segment of the present invention where the locking segment is divided into a plurality of locking segments, each of which is hinged for vertical movement to the top cover.

Figure 1:
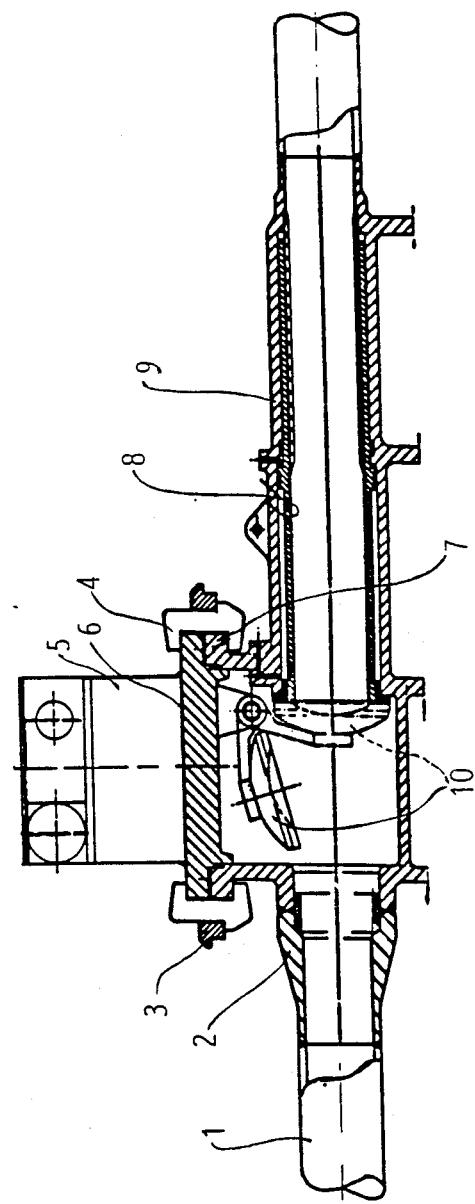
FIG. 1 illustrates an axial sectional view of a valve with a locking device of the present invention.
Figure 2:
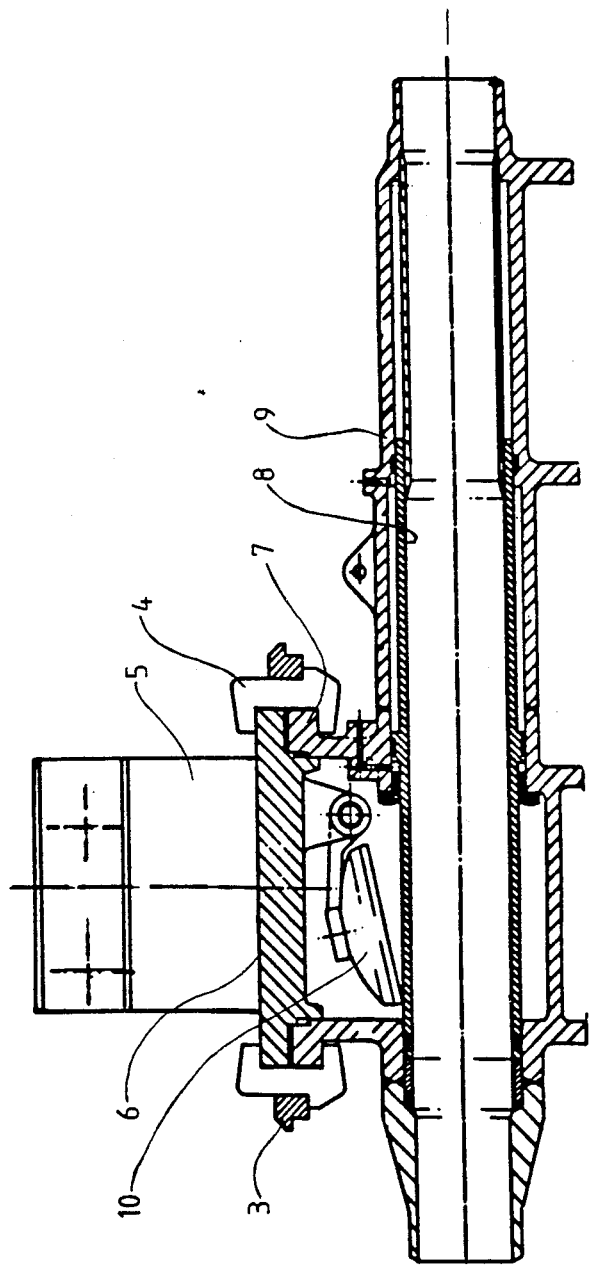
FIG. 2 illustrates the valve of FIG. 1 where the valve chamber has been isolated.
Figure 3B:
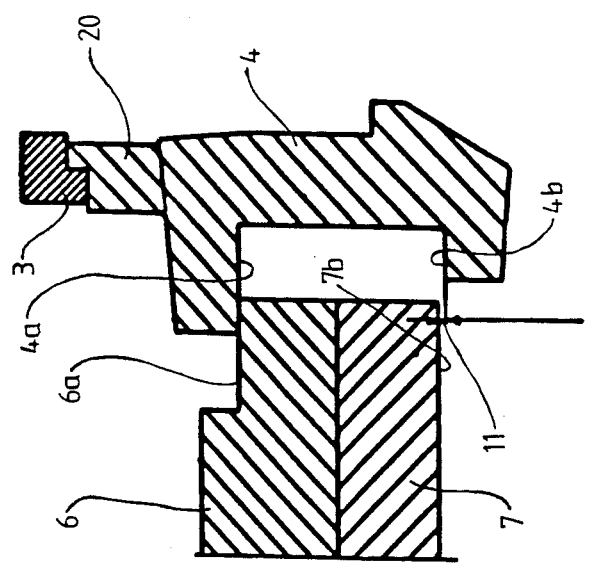
FIGS. 3A and 3B illustrate a locking segment of the present invention in the locked and unlocked position, respectively.
Figure 3A:
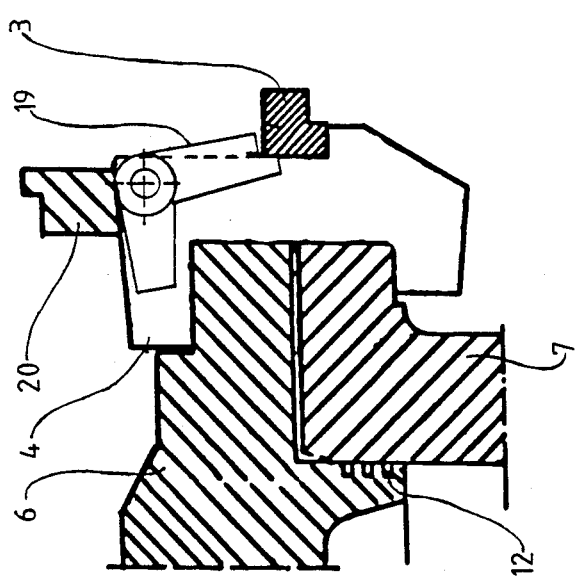

A somewhat more detailed description of the drawings follows:

FIG. 1 is an axial sectional view through a pipeline with a valve installed where the locking device according to the invention is used;

FIG. 2 is an axial sectional view corresponding to that in FIG. 1, but here, a telescopic displaceable internal tube is moved to isolate the valve chamber from the pipe bore. In this position, the transportation pipeline can be scraped and the housing cover dismantled for inspection and control, at the same time as the transportation pipeline is intact and can be used;

FIG. 3A and 3B are detail sketches which show a radially displaceable locking segment in closed locking position and open releasing position respectively. It appears that the housing cover in FIG. 3B bears against the valve housing flange, as a clearance is provided between the bottom edge of the valve housing flange and the locking segment. FIG. 3A shows the housing cover in normal position where it is clamped by means of the locking segments, which in their turn are secured against radial sliding by means of a locking ring. In FIG. 3A, the valve pressure is applied, so that the cover is lifted to normal position where the top part bears against the bottom side of the upper flange of the locking segments. The same clearance which is provided in FIG. 3B is also provided in FIG. 3A, but is there located between the topside housing cover flange and the bottom side housing cover flange.

FIG. 4A–4G show an embodiment where the locking segments can be moved almost radially in and out between open releasing position and closed locking position. The locking segments are here mounted on the housing cover topside and are moved in relation to this by means of sliding checks designed on its topside. FIG. 4F and 4G are partial cross-sectional views according to line IVF—IVF and line IVG—IVG on FIG. 4A respectively.

Figure 5A:
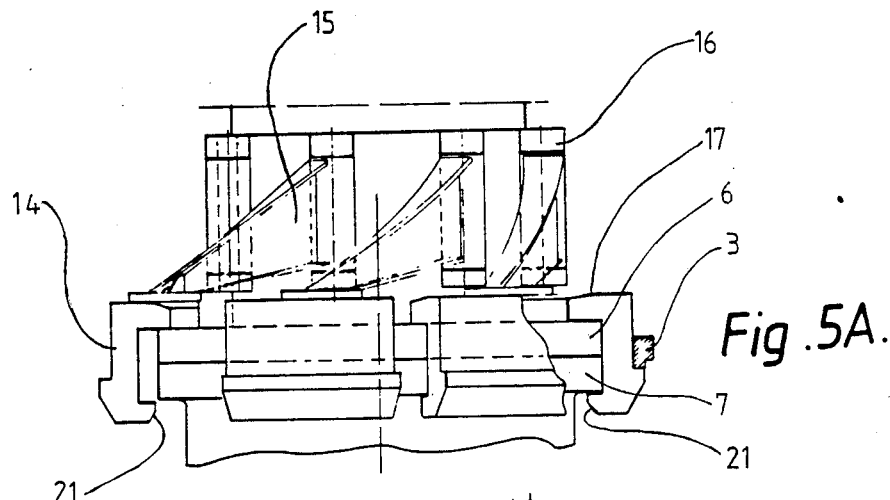
FIGS. 5A and 5B illustrate a locking segment of the present invention where the locking segment is divided into eight locking segments, each of which is hinged for lateral movement to the top cover.
Figure 5B:
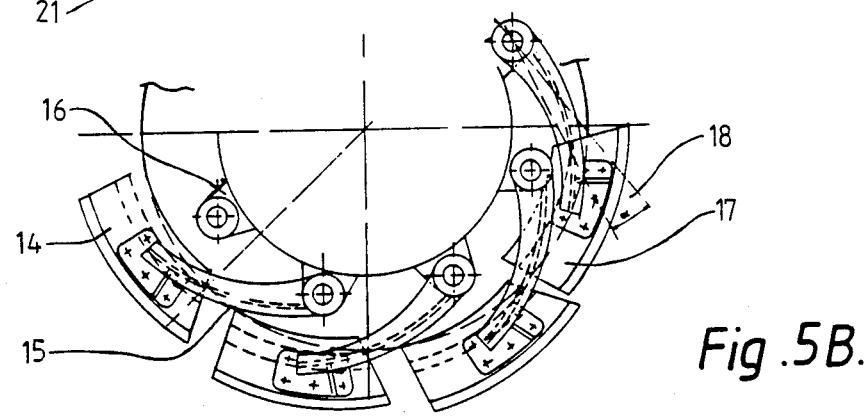

FIG. 5A and 5B are part sketches of a device where a total of eight locking segments are hinged onto the housing cover and are pivotable from a closed locking position to open releasing position (approx. 12 degrees). In the open position (to the left in FIG. 5A), the top edge of the locking segment will at any time bear against the cover topside. The load on the hinge will thus be minimal. To the right in FIG. 5A, a locking segment is shown in closed locking position. At the bottom end, this locking segment features a bevelled edge which serves to facilitate the centering of the housing cover in relation to the housing flange during lowering and mounting;

FIG. 6 is a part sketch of a locking device where the locking segments are hinged onto the housing cover, and are vertically pivotable to open releasing position and closed locking position respectively. The segments are controlled through vertical movement of a control ring. This is done by means of a special tool.

FIG. 7A and 7B are partial schematic views according to line VII—VII in FIG. 6 and show a locking segment in closed locking position (before the valve pressure is applied) and open releasing position for the housing cover. In FIG. 7B, the special tool keeps the control ring in position where the locking segments are maintained in open releasing position.

DETAILED DESCRIPTION OF THE DRAWINGS

MODES FOR CARRYING OUT THE INVENTION

Reference numeral 1 signifies a pipeline, and 2 indicates a sleeve section for connecting of emergency shut-down valve.

Reference numeral 3 signifies a locking ring arranged to enclose a number of locking segments 4. An actuator 5 for control of the valve is mounted on top of the housing cover 6 which is to be locked to a housing flange 7 by means of the abovementioned locking segments 4. Reference numeral 8 indicates a telescopic displaceable tube which on FIG. 2 is moved to a position where the pipe bore is shut off from the valve chamber. In this position, transportation pipeline 1 can be scraped, and housing cover 6 with actuator 5 can be dismantled for inspection and control. In the position shown in FIG. 2, transportation pipeline 1 is intact and can be used.

In FIG. 1 and 2, 9 signifies the valve housing, and 10 indicates a check valve (solid lines) in open position, and (broken lines) in closed position, where it isolates one pipeline joint from another in the event of a blow-out etc.

With special reference to FIG. 3A and 3B, each locking segment 4 consists of one element which in operating position (pipeline 1 is then assumed to be horizontal, whereby the valve housing axis is vertical) is shaped as a lying U where the opening is turned inward towards the middle of the housing cover 6. The oppositely faced contact and sealing surfaces 4a and 4b of the U are internally parallel and plane and are designed to engage with the topside 6a of the valve housing cover 6 and bottom side 7b of the valve housing flange 7 respectively. It appears from FIG. 3B that the valve housing cover 6 bears against the valve housing flange 7, and that a clearance 11 thus is provided between the bottom side 7b of the valve housing flange 7 and the adjacent surface 4b of the locking segment 4. This is due to the fact that the locking segments according to the invention are dimensioned so that the distance between their facing contact and sealing surfaces 4a and 4b exceeds the total thickness of valve housing cover 6 and flange 7. When the valve pressure is applied, the valve housing cover 6 is lifted up from the valve housing flange 7 and remains clamped and locked against the adjacent contact and sealing surfaces 4a on locking segments 4. A gasket device 12 attends to the sealing between cover 6 and flange 7.

The locking segments according to FIG. 4A-4G are mainly of the same design as those in FIG. 3A and 3B. The locking segments according to FIG. 4A-4G however are mounted on radial or almost radial guide supports 13 displaceable between open releasing position (FIG. 4C and 4E) for the valve housing cover 6 and closed locking position (FIG. 4B and 4D). The locking segments 4 are mounted on the topside of the valve housing cover 6.

Also for the embodiment according to FIG. 5A and 5B, the locking segments mainly have the same design as in the already discussed embodiments. More specifically, for the embodiment according to FIG. 5A and 5B, a total of eight locking segments are mounted which are hinged onto the valve housing cover 6, so that they are pivotable from closed to open position (approx. 12 degrees). In FIG. 5A and 5b, the reference numeral 14 signifies a pivoting locking segment in open position, 15 signifies a pivot lever for a pivoting locking segment as 16 signifies an upper bearing for the pivot lever 15, and reference numeral 17 indicates a pivoting locking segment in closed position. Reference numeral 18 signifies the angular swing for pivot lever 15 from open to closed position. Reference numeral 19 indicates a stopper for the locking ring 3 (FIG. 3A) when the locking segments 4 are in a locking position, and 20 indicates a stopper for the locking ring 3 when the locking segments 4 are in an open position.

In open position, as held by the locking segments 14, the locking segments' upper, down-turned contact and sealing surface will at any time bear against the valve housing cover's 6 upper contact and sealing surface section. The load on the hinges will thus be minimal. Reference numeral 21 signifies a bevel edge designed on the locking segments 14, 17 to facilitate the centering of the valve housing cover 6 in relation to the valve housing flange 7 at lowering and mounting of the cover 6.

FIG. 6, 7A and 7B depict a locking device where the locking segments 22 are hinged onto valve housing cover 6 and can be vertically pivoted for opening and closing. The locking segments 22 are controlled by means of a vertically displaceable ring 23. This is provided by means of a special tool 24. In FIG. 7B, this special tool 24 keeps the ring 23 in a position which secures maintenance of the locking segments 22 in an open position.

All versions of pivoting and displaceable locking segments according to the invention have in common that they are mounted with clearance to the bottom edge 7b of the valve housing flange 7 and thus without any type of pre-stressing. The contact and sealing surfaces are parallel surfaces. The load on the locking segments, when the valve pressure is applied, does therefore not involve any extra load on the locking ring 3, 22. Locking segments which execute a combined moving/pivoting movement between open and closed position are also relevant.

I claim:

1. Device for clamping and locking a valve housing cover (6) against a flange (7) on valve housing (9) for subsea pipelines (1) said device comprising:

movable locking segments (4; 14, 17; 22) which in operating position is substantially U-shaped with the opening turned inward to the middle of the cover (6), said locking segments having opposite facing contact and sealing surfaces (4a, 4b) for engagement with cover (6) and flange (7), the locking segments (4; 14, 17; 21) having a certain clearance so that the distance between the opposite facing, parallel contact and sealing surfaces (4a, 4b) of the mainly U-shaped locking segments exceeds the total thickness of said cover (6) and flange (7) which the locking segment is arranged to engage, wherein the locking segments can be mounted without prestressing, since the device is adapted to utilize the internal pressure of the subsea installation in order to urge the cover (6) away from the flange (7) and against the adjacent contact and sealing surfaces 4a) of the locking segments, so that the locking segments absorb the entire force from the internal pressure of the subsea installations, and that the cover (6) thus is maintained in its position clamped against the flange (7) by means of the locking segments (4; 14, 17; 22), as the cover (6) and flange (7) are designed with surfaces displaceable against each other with a sealing device (12) in between; and a locking ring (3) which is designed to enclose a number of locking segments (4; 14, 17; 22), where the said locking ring (3) is designed for and arranged to bear with locking effect against the outside of the locking segments when these are in a locking position.

2. Device in accordance with claim 1 wherein the locking segments (4) are displaceably arranged on the topside of the cover (6) and are guided along radial or almost radial guide supports (13) between a releasing position for the cover (6) and a closed locking position.

3. Device in accordance with claim 1 wherein the locking segments (14, 17; 22) are hinged onto the cover (6), so that they can be pivoted between a closed and an open position.

4. Device in accordance with claim 3 wherein each locking segment (14, 17) is supplied with a pivot lever (15) which is mounted in a bearing (16) of the cover (6).

5. Device in accordance with claim 3 wherein the locking segments (14, 17) have a bevel edge (21) to facilitate the centering of the cover (6) in relation to the flange (7) during lowering and mounting of the cover (6).

6. Device in accordance with claim 3, further comprising one vertically displaceable ring (23) which serves to guide the pivoting locking segments (22), and which is adapted to be operated by means of a tool (24) whereby the ring (23) can be brought into a position which secures the latching of the locking segments (22) in an open and closed position respectively.

* * * * *